United States Patent [19]

Narveson et al.

[11] Patent Number: 4,479,399
[45] Date of Patent: Oct. 30, 1984

[54] CHIP SYSTEM TO MONITOR AND DIGITALLY CONTROL A MULTIPLE CLUTCH TRANSMISSION

[75] Inventors: Brian C. Narveson, Darien; Frank R. Bauer, Glenview, both of Ill.

[73] Assignee: International Harvester Co., Chicago, Ill.

[21] Appl. No.: 381,261

[22] Filed: May 24, 1982

[51] Int. Cl.³ .................. F16H 3/02; F16H 3/38; F16D 25/10; F16D 25/00
[52] U.S. Cl. .................. 74/339; 74/745; 192/3.58; 192/87.15
[58] Field of Search .......... 192/3.58, 3.61, 3.62, 192/48.7, 48.9, 87.14, 87.15, 87.16, 3.57; 364/424.1; 74/339, 843, 861, 864, 865, 866, 867, 868, 869, 745

[56] References Cited

U.S. PATENT DOCUMENTS

| | | | |
|---|---|---|---|
| 3,348,643 | 10/1967 | Townsend | 192/3.58 |
| 3,548,980 | 12/1970 | Schmidt | 197/3.58 X |
| 3,652,901 | 3/1972 | Wakamatsu et al. | 74/866 X |
| 3,944,035 | 3/1976 | McRay | 192/3.57 |
| 4,138,907 | 2/1979 | Melles | 74/687 |
| 4,234,066 | 11/1980 | Toyota et al. | 192/3.58 X |
| 4,262,335 | 4/1981 | Ahlen et al. | 364/424.1 X |
| 4,376,473 | 3/1983 | Tomasek | 192/3.58 |
| 4,380,278 | 4/1983 | Lasken | 192/3.58 |
| 4,388,987 | 6/1983 | Hennessey et al. | 192/3.58 |
| 4,425,620 | 1/1984 | Batcheller et al. | 364/424.1 |

FOREIGN PATENT DOCUMENTS 2033032  5/1980  United Kingdom .

Primary Examiner—Allen D. Herrmann
Assistant Examiner—Arthur T. Quiray
Attorney, Agent, or Firm—Boris Parad; F. David Aubuchon

[57] ABSTRACT

Three clutch system for operating the composite transmission power train of a farm tractor, comprising first and second power shift clutches, and a master clutch connected by intervening gearing in separate paths to the different power shift clutches so as to be in series with either one. The power shift clutches are selectively connected by electrical hydraulic controlling means to a tractor engine at an engine connected end of a speed transmission in the power train; the master clutch is at the output end of the speed transmission, connecting it to a range transmission which completes the composite transmission power train hereof. A digital microcomputer chip is responsive to manually controlled engagement and disengagement of the master clutch and to other critical control parameters, and is programmed to monitor and control the three clutch controlling means.

16 Claims, 5 Drawing Figures

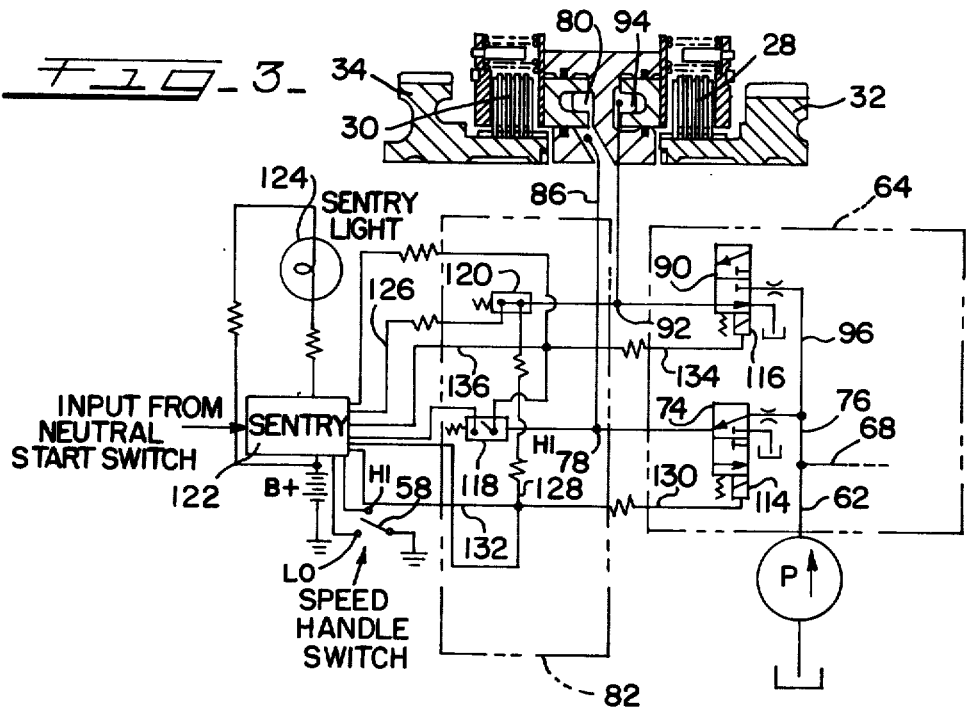
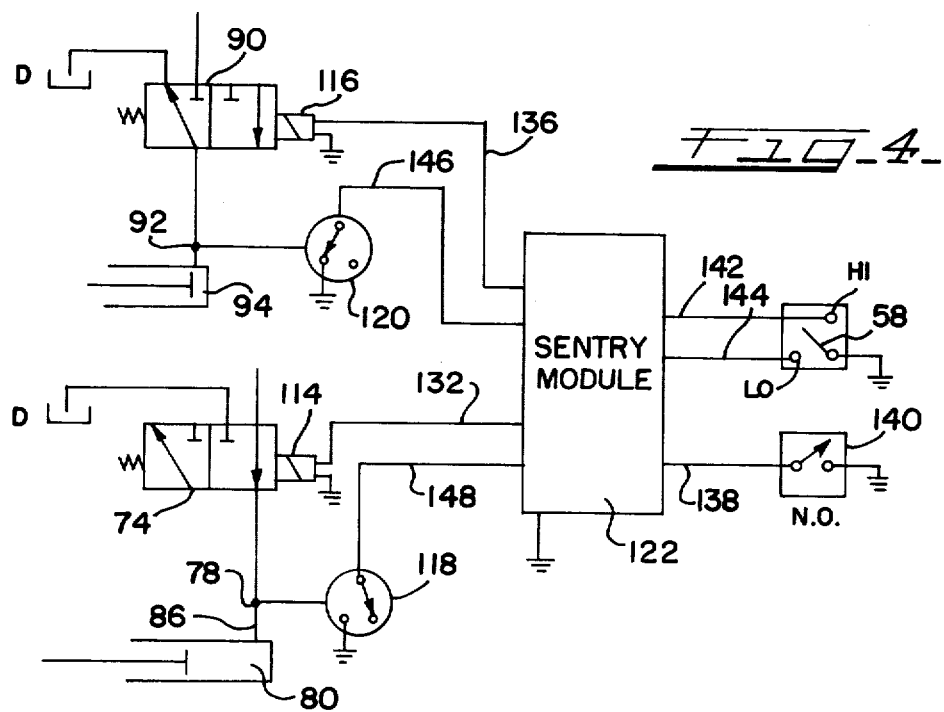

CHIP SYSTEM TO MONITOR AND DIGITALLY CONTROL A MULTIPLE CLUTCH TRANSMISSION

This application is a companion case to co-assigned applications U.S. Ser. No. 241,264, filed Mar. 6, 1981, now U.S. Pat. No. 4,388,278, Ser. No. 247,704, filed Mar. 26, 1981 now U.S. Pat. No. 4,376,473; and Ser. No. 379,549, filed May 18, 1982, (D-4216) by Harold W. Melles and George R. Vater for Synchronized Multi-Range Transmission. Background publications include but are not limited to the U.K. patent application of Xaver Fendt & Co., G.B. No. 2,033,032 published May 14, 1980.

The invention relates to a three clutch system for operating the composite transmission power train of a vehicle, for example, a farm tractor transmission. More particularly, it relates to first and second power shift clutches, and to a master clutch connected by intervening gearing and separate gear ratio paths to the different power shift clutches so as to be in series with either one. The power shift clutches are selectively connected to a vehicle engine at an engine connected end of a speed transmission in the power train; the master clutch is at the output end of the speed transmission, connecting it to a range transmission we provide which completes the composite transmission power train hereof.

Change speed transmissions that shift gears by engaging a first power shift clutch while substantially disengaging the second such clutch are known, both heretofore and more recently as evidenced by the above three co-assigned applications of which the disclosures are incorporated in entirety herein by reference. The first and second clutches are high ratio and low ratio clutches, operating with overlap in a short period of simultaneous engagement. In our efforts to reach the precise coordination necessary, we can run into an obvious problem if the selected first clutch fails to promptly and fully engage during a power shift to change the transmission to the new gear ratio desired. Or the coordination will be a problem if the second clutch fails to disengage after the power shift, fully and in timely fashion. And finally coordination can be problem with the master clutch engagement if the ongoing first power shift clutch fails to promptly and fully engage before the master clutch is manually engaged.

Close monitoring and automatic control to eliminate the foregoing problems, difficulties, and disadvantages require considerable versatility in a chip. Yet presently a digital microcomputer chip is programmed to afford just that monitoring and controlling versatility required for the composite power train hereof, which the ordinary logic circuit would find difficult to cope with.

Further features, objects and advantages will either be specifically pointed out or become apparent when, for a better understanding of our invention, reference is made to the following description taken in conjunction with the accompanying drawings which show a preferred embodiment thereof and in which.

Figure 5:
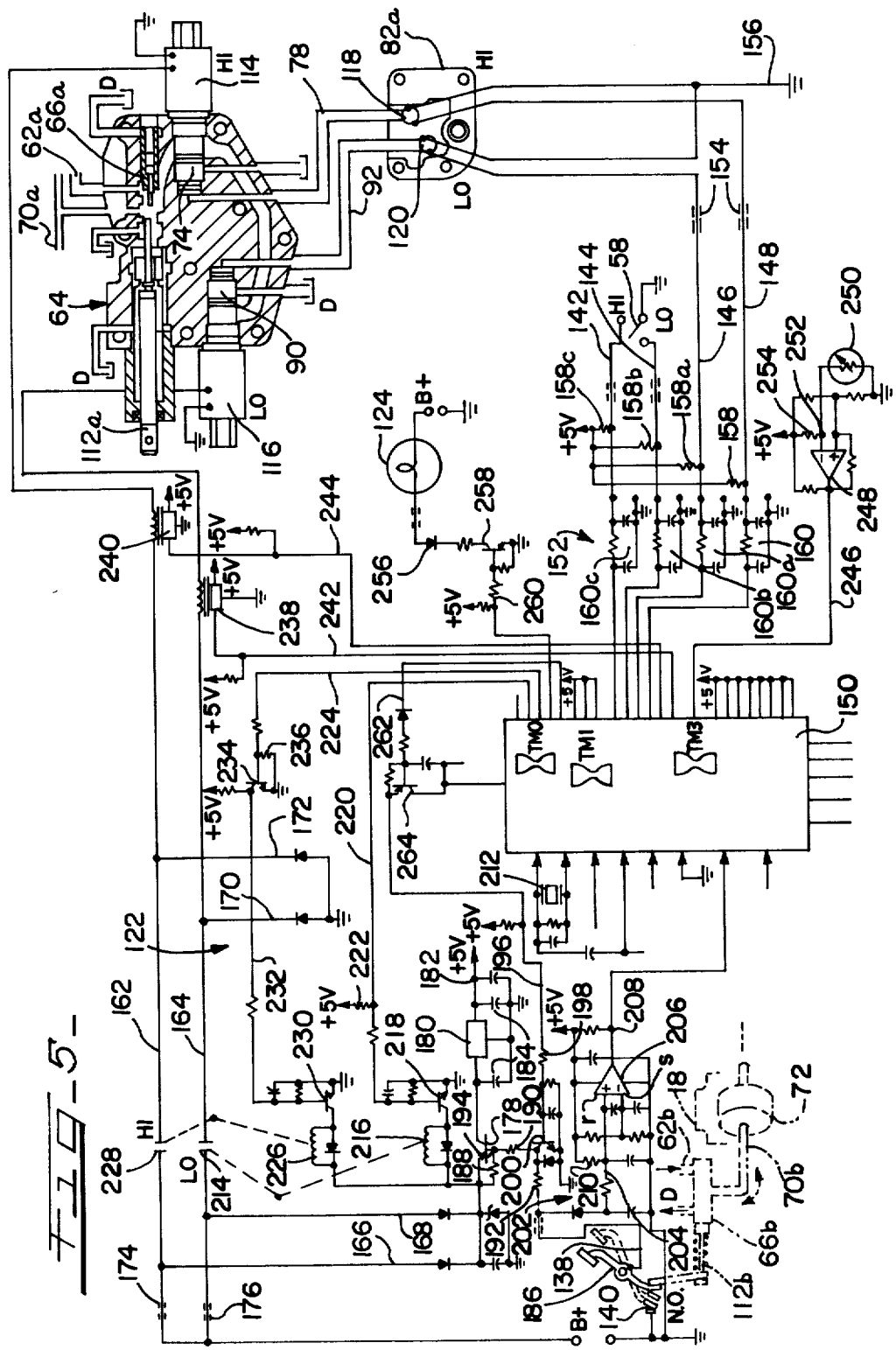

FIG. 3, similarly, is a fragmentary view of the speed transmission schematically illustrating the electrical hydraulics, deliberately oversimplified into a logic-circuit type understanding in showing the interrelationship of parts;

FIG. 4 is a revised schematic differing from FIG. 3 by showing the actual interrelationship of parts; and FIG. 5 is the full electrical schematic diagram.

Figure 1:
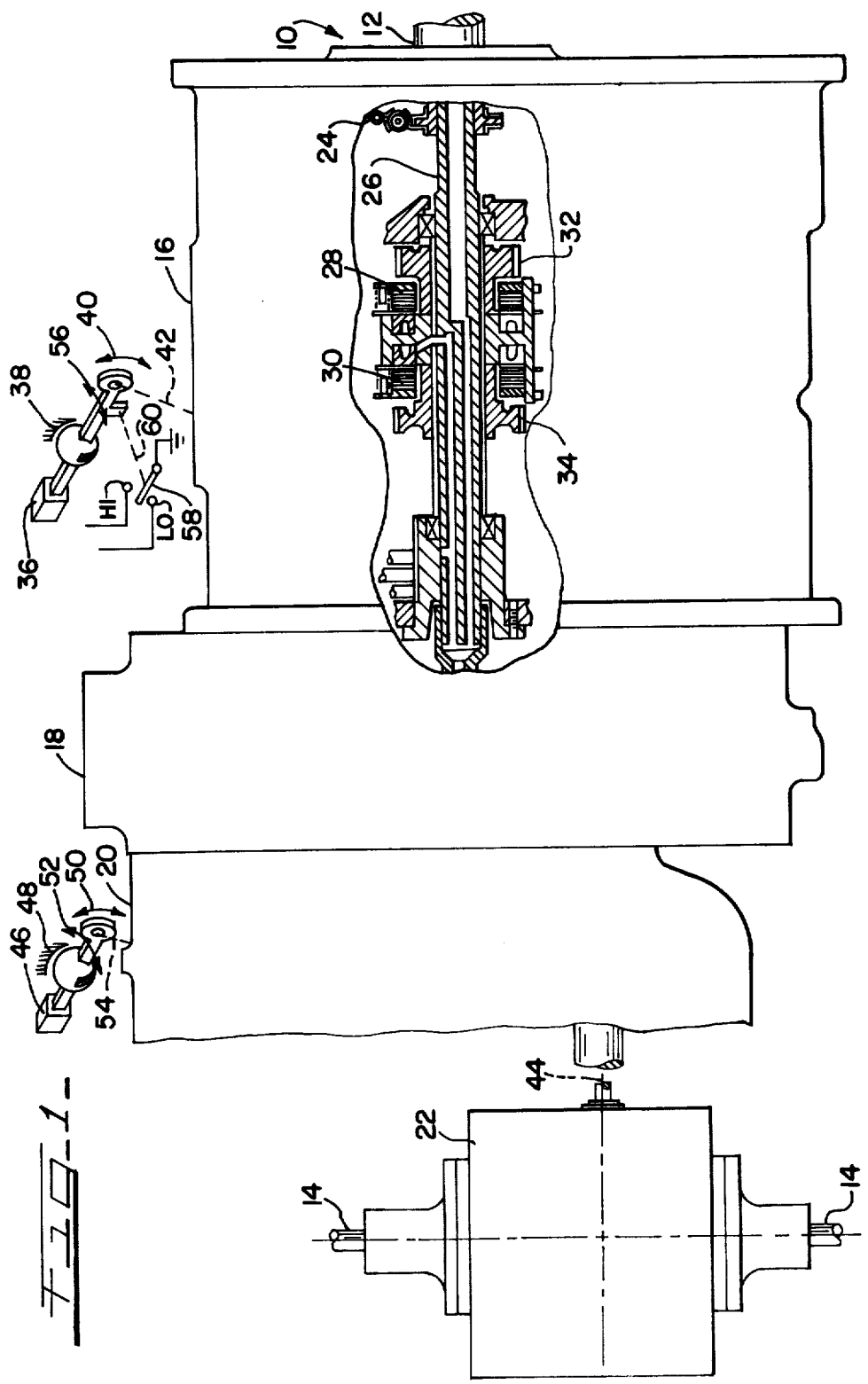
FIG. 1 is a view, partially in plan, partially in elevation, and partially in cross section, of a three clutch composite transmission power train including a speed transmission but without the hydraulics, and monitored and controlled according to an embodiment of the present invention.

More particularly in FIG. 1 of the drawings, the composite transmission power train which appears is of the type generally as shown in the published U.K. patent application No. 2,033,032/1980 referred to above and relating to tractor vehicles including an agricultural tractor. Specifically in connection with the power train illustrated at 10, the crankshaft 12 of a farm tractor engine drives the oppositely extending wheel connected axles 14 of the tractor in a path through the power train including, in order, a speed transmission 16 outlined by its housing, a manual master clutch 18 outlined by its housing, a range transmission 20 outlined by its housing, and a differential 22 outlined by its housing, thence to the pair of axles 14 leading to the final drive for the rear traction wheels of the tractor.

By flywheel connections, not shown, the engine crankshaft 12 turns a flex plate coupling and damper 24 connected to a shaft 26 at the input end of the speed transmission 16. Respective low 28 and high 30 power shift clutch packs selectively connect the input shaft to a low speed drive gear 32 for the speed transmission or to a high speed drive gear 34. The difference in the speed afforded by the speed transmission 16 in one physically constructed embodiment of the invention was 17% depending upon which of the clutches 28 and 30 was selected.

A speed transmission handle 36 supported on a universal fulcrum 38, when tilted by the tractor operator in the motion direction indicated by the double headed arrow 40, acts through a mechanical transmission connection 42 to select three separate gear ratios alternatively driven by the low speed or high speed gears 32 and 34. So the parallel power path portions selectively provided by the low 28 and high 30 clutches enable the speed transmission 16 to yield six speeds, three changes of which are by power shift.

Interposed in a common path at the power output end of the speed transmission 16 is the manual master clutch 18 effectively in series with the intervening gear ratio trains, not shown, and with either power shift clutch 28 or 30.

The master clutch 18 at the end of the speed transmission 16 connects it to the range transmission 20 of the type generally as shown in coassigned U.S. Pat. No. 4,138,907. A propeller shaft 44 in turn connects the range transmission 20 to the differential 22 at the rear of the tractor.

A range handle 46 has a fulcrum as is standard and as is simply represented by a schematic ball joint 48 so as to have the tilt movement of a double headed arrow 50 and lateral movement indicated by an arrow 52 as necessary in a quadrant of familiar H-shape.

A mechanical connection 54 between the handle 46 and range transmission 20 enables the transmission to accommodate to the five handle settings neutral, reverse, high, low, and medium range.

The foregoing three forward ranges enable the six speed transmission 16 in cooperation therewith to provide eighteen speeds forward to the differential 22, broken down into nine pairs in which the two speeds of each pair can be power shifted back and forth between one and the other.

The standard support indicated schematically as a universal fulcrum 38 for speed handle 36 affords similar lateral movement to the speed handle in the direction of the double headed arrow 56. A speed handle switch 58 is operated by the speed handle 36 through a mechanical connection 60 to provide a selection as between a contact HI to electrohydraulically operate the high clutch 30 and a contact LO to power shift on the go and operate the low clutch 28. Similarly, the high clutch 30 power shifts on the go.

Figure 2:
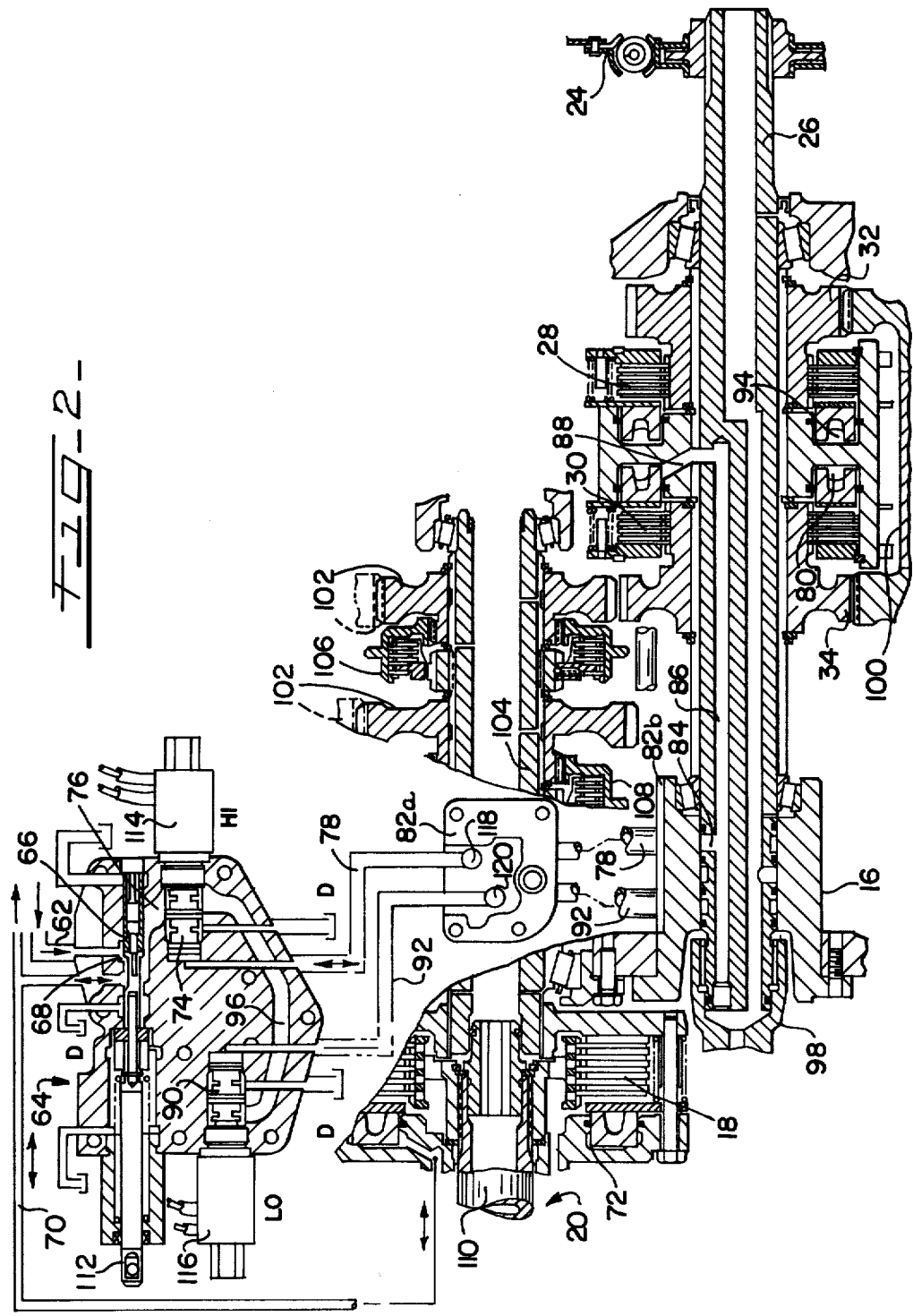
FIG. 2 is a view, similarly, of the speed transmission to an enlarged scale and including the hydraulics.

The electrical hydraulic control for the three clutch system engages and disengages the clutches hydraulically as will now be explained in the description of FIG. 2.

ELECTRICAL HYDRAULIC CONTROL HYDRAULICS—FIG. 2

A pressure fluid line 62 according to this figure supplies a common valve block 64 so as to hydraulically operate generally two and sometimes three (temporarily), clutches of the three clutch system. More particularly, a modulator master valve 66 applies, through a pressure fluid first branch 68 or relieves through an adjacent drain D, hydraulic clutch pressure in a master clutch service line 70 leading into the clutch cylinder 72 for operating the master clutch 18.

An off-on HI valve 74 fully applies, through a pressure fluid second branch or relieves through an adjacent drain D, hydraulic pressure from a supply passage 76 to a high service line 78 leading in a path to the clutch cylinder 80 of the high clutch 30. More particularly, a manifold cover appearing in this figure in top plan at 82a and in side elevation at 82b falls in the path leading from the high service line 78 and through a radial passage 84 and a longitudinal passage 86 in the speed transmission input shaft 26, thence through a radial passage 88 into the high clutch cylinder 80 as mentioned.

Similar passages in the manifold cover 82a, 82b and input shaft 26 complete the complementary path from an off-on LO valve 90 through a low service line 92 into the manifold cover, and the input shaft 26, thence into the clutch cylinder 94 for the low clutch 28. Like its counterpart HI valve 74, the off-on LO valve 90 either fully applies, through a pressure fluid second branch extension 96 or fully relieves through an adjacent drain D, hydraulic pressure in the low clutch cylinder 94.

The change speed operation of the speed transmission 16 introduces a stepped assortment of power paths now to be explained.

SPEED TRANSMISSION POWER PATHS—FIG. 2

In this figure, preferably when it is driven at constant engine speed, the speed transmission input shaft 26 is used to provide a straight through drive to the shaft 98 of an independent power take off, not shown. And through appropriate mesh with complementary pinions on a countershaft 100 journalled in the speed transmission 16, the selected low speed and high speed drive gears 32 and 34 are able, through conventional intermediate gearing 102 on the countershaft 100 and the speed transmission output shaft 104, to in effect double the power paths which are available. For this purpose two blocker type synchronizer collars 106 and 108, shiftable by the speed handle, previously described, afford either a 1-2 speed, a 3-4 speed, or a 5-6 speed of the shaft 104, and the shift between 1 and 2 speeds is by power from the clutches 28,30, the shift between 3 and 4 speeds similarly by power shift, and the shift between 5 and 6 speeds is similarly by power.

The master clutch 18 transmits, to the input shaft 110 of the range transmission 20, any one of the just mentioned six speeds of the speed transmission output shaft 104, and the rotation continues in the range transmission 20 through its high range, medium range, or low range paths, or through reverse.

The modulator master valve 66 has a pedal-operated protruding spool 112 accessible outside of the block 64 to provide the necessary precise manual modulation for the manual master clutch 18.

The HI valve 74 in valve block 64 is electromagnetically operated by a HI solenoid 114. The LO valve 90 is similarly electromagnetically operated by a LO solenoid 116.

Illustratively superimposed on the manifold cover in its top plan view 82a, are a pressure switch 118 in contact with and operated by hydraulic fluid in the high service line 78, and a low pressure switch 120 in contact with and operated by hydraulic fluid in the low service line 92.

The interrelationship of the foregoing solenoid and pressure switches with the on-off clutch valves and clutches in the electrical hydraulic control will now be explained, simplified, in terms of overlapping the operation of clutches 28 and 30 for smoother power shifts.

ELECTRICAL HYDRAULIC CONTROL SIMPLIFIED—FIG. 3

The electrical hydraulic circuit schematically diagrammed in this figure is highly oversimplified for ease in understanding the simultaneous engagement of the low and high clutches 28,30 (temporarily) after the master clutch, not shown, has at least initiated its delayed action engagement.

More particularly, a sentry module 122, which is digitally microcomputer-controlled, constantly monitors the speed handle switch 58, the pressures existing in the manifold cover 82, and the electrical operation within the valve block 64, and is programmed as microprocessor to exert electrical hydraulic control over the low and high clutches 28 and 30. For these purposes, the sentry module 122 receives power from a B+ electrical source and, for its monitoring purpose in indicating a failure mode of the equipment, the sentry module 122 operates an instrument panel sentry light 124 which it turns on as a failure signal and which is supplied by the same B+ D.C. source.

In normal start up operation, the closed pressure switch 120, for example, for the low clutch cylinder 94 which is at zero pressure in that idle cylinder, stays closed illustrated to prepare a circuit from a supply conductor 126 out of module 122, through a conductor 128, thence through a conductor 130 into the solenoid coil 114 of the off-on HI valve 74. So, when the operator moves the speed handle switch 58 up to the HI contact, the module 122 as programmed automatically energizes supply conductor 126 and electromagnetically opens the HI valve 74. At a threshold pressure set at 58 psi (400 kPa) for example, the high pressure switch 118 opens as illustrated under the rising clutch pressure; the pressure continues to rise hydraulically as the valve 74 applies it through the high service line 78 and passage 86 leading into the high clutch cylinder 80.

The reason why the pressure switches such as 118 stay open at and above the threshold pressure, will become apparent when a clutch shifting operation is considered. An on-the-go-shift change of the speed handle switch 58 from the contact LO to its contact HI would necessarily occur at a time when the low pressure switch 20 is open, rather than closed as illustrated in FIG. 3. The reason would be that the off-on LO valve 90 would be supplying, through the low service line 92, the low clutch cylinder 94 with full clutch engagement pressure and also the pressure switch 120 with full pressure so as to hold the switch 120 open as just described.

Movement of the speed handle switch 58 to the contact HI would be sensed thereby and cause the module 122 to utilize an alternate supply conductor 132 to energize the HI solenoid 114 independently of switch 120 and therefore shift the off-on high valve 74 to open position as illustrated in FIG. 3. Accordingly, through high service line 78 the rising high clutch actuating pressure upon reaching threshold value (58 psi) will first open the pressure switch 118 and thus deenergize a conductor 134 supplying power to the LO solenoid 116. The off-on LO valve 90 will therefore connect the low clutch cylinder 94 to drain and, at and below a lower threshold pressure (43 psi, for example) the low pressure switch 120 will close as illustrated in FIG. 3, allowing the sentry module to supply the high solenoid 114 with current through the regular supply conductor 126 and switch 120.

The counterpart operation for on-the-go downshifting of the speed handle switch from contact HI to contact LO, utilizing the alternate supply conductor 136, will be apparent and hence the description is omitted. Conductor 136 corresponds of course to the alternate supply conductor 132 just discussed.

In actuality, the high pressure switch 118 and LO solenoid 116 are not series connected, nor are the low pressure switch 120 and HI solenoid 114 series connected, even though such simple direct connections would do in a basic logic circuit if employed. The monitoring functions of the sentry module 122 are considerably more extensive, necessitating that the connections in fact be made according to FIG. 4 now to be explained.

ELECTRICAL HYDRAULIC CONTROL IN ACTUALITY—FIG. 4

In this figure, by means of an interconnecting conductor 138, the sentry module 122, while operating, continuously monitors a normally open, clutch pedal switch 140. By similar conductors 142 and 144, the module continuously monitors the speed handle switch 58 for whichever selective position it assumes.

The module 122 by a conductor such as 136 not only supplies current to operate the particular valve solenoid selected, but also continuously monitors the current flowing in that solenoid. And through conductors 146 and 148 the module monitors the two pressure switches 120,118 to determine the pressure in the respective cylinders 94 and 80 relative to the set threshold pressures (58 and 43 psi) which establish the critical operating values.

The pressure switch monitoring means within the module 122 is best explained with reference to FIG. 5 now to be described.

PRESSURE SWITCH MONITORING—FIG. 5

The sentry module 122 according to the showing of this figure includes a digital microcomputer chip 150 to which the monitored HI and LO pressure switches 118 and 120 are connected by respective conductors 148 and 146 leading to the chip 150 through paths in an RC filter network generally indicated at 152.

More particularly, the conductors 148 and 146 are protected from electromagnetic interference (EMI or Circuit Noise) by ferrite beads 154 which are connected on the circuit or hot side of the respective switches 118 and 120, each grounded at 156 on the ground side. The switches 118 and 120 are normally closed due to lack of hydraulic pressure sensed; hence a switch pull up resistor, such as resistor 158, connected to a five volt source is held at its lower end at the ground potential of ground 156 by means of the switch 118 concerned.

The high pressure conductor 148 from the switch 118 leads through a two capacitor—one resistor pi filter network 160 protecting against the transmission of noise into the chip 150. So the associated interconnecting pin on the chip goes low and the monitor chip interprets such an input signal to indicate, correctly so, a closed switch condition at 118.

Yet as rising pressure in the associated high service line 78 reaches and exceeds the upper threshold pressure value (e.g. 58 psi) the HI pressure switch 118 opens its contacts and the conductor 148 is open circuited. Therefore the pull up resistor 158 brings the conductor 148 and the associated pin on chip 150 to +5 volts DC causihg the pin potential to go high and indicate to the monitoring chip 150 that pressure in the high clutch line 78 is at or above its upper threshold value.

The low pressure conductor 146 is similarly connected by a pull up resistor 158a and a pi filter network 160a so that the associated pin on chip 150 will similarly go high in its relative potential level whenever the LO pressure switch 120 opens at and stays open above the threshold pressure. So chip 150 senses an open pair of switch contacts at 120.

By similar connections made by a pull up resistor 158b and pi filter network 160b, the LO contact of the speed handle switch 58 when opened will allow the conductor 144 and the associated pin on the chip 150 to go high in potential value, indicating that the low clutch is being pressurized in the low service line 92 by the off-on LO solenoid valve 116.

The HI contact of the speed handle switch 58 electrically functions in similar way through pin connections made to a pull up resistor 158c and a pi filter 160c.

PEDAL SWITCH MONITORING AND +5 V SUPPLY—FIG. 5

A DC source indicated at B+ is connected in common to a HI solenoid supply conductor 162 and a LO solenoid supply conductor 164. The take offs therefrom to the sentry module circuit 122 include the diodes of a pair of diode conductors 166 and 168 and another pair of grounded diode conductors 170 and 172. Together with a pair of ferrite beads 174, 176 in the conductors 162 and 164, the pairs of diodes protect the module circuit from noise, from voltage peaks and spikes and oscillations and, to the degree necessary, protect against the inadvertence of wrongly reversing the terminals of the B+ source when the operator is initially connecting up.

A B+ connected, p-n-p transistor 178 energizes a regulator 180 to establish a regulated 5 volt supply required at junction 182 for the circuit of, and by, the module 122. The necessary capacitance to stabilize the regulator is indicated at 184.

The clutch pedal of the tractor indicated at 186 turns on, among other things, the supply transistor 178 for the regulator 180 and is in its declutching position when doing so.

By means of the clutch pedal switch 140 and appropriate circuitry or, if desired, by means of separate contacts (not shown) operated by the pedal 186, the operator can depress the pedal 186 into its broken line position to close the pedal's contacts. So a circuit, not shown, is prepared which is in series with a low resistance tractor to be cranked and started from a regular crank-run ignition switch, not shown. In other words, the spring disengaged master clutch cylinder 72 is relieved of all residual hydraulic pressure by the depressed pedal 186, thus ensuring that the master clutch is disengaged before the starter motor can be used to crank the tractor engine.

With respect to the pedal conductor 138 operated by the pedal switch contact 140 and supplying the sentry module circuit, foot pressure on the pedal 186 makes the switch close and connect a base bias resistor 188 to ground through series connected resistors 190 and 192, thus turning on the regulator transistor 178. Release of the pedal 186, on the other hand, initiates reengagement of the master clutch 18 by the cylinder 72 and also open circuits the conductor 138. So the p-n-p transistor 178 stops conducting.

More specifically, depression of pedal 186 to close, to ground, the conductor 138 causes current to flow through the resistors 192, 190 and 188, causing the junction 194 to go negative with respect to the transistor 178, thus forward biasing that supply transistor 178 so that it conducts and supplies the regulator 180 for its regulated +5 V output. Release of the pedal 186 to reengage the clutch interrupts current flow through the bias resistor 188, allowing the junction 194 to rise toward the emitter voltage, stopping conduction in the supply transistor 178 and interrupting the +5 V output, except for one thing.

Anytime the regulated supply is producing a +5 V output at 182, a +5 V latching circuit 196 is receiving the thus regulated voltage and supplying it through a resistor 98 to the base of an n-p-n holding transistor 200. The grounded emitter of the transistor 200 causes current to circulate through resistors 188 and 190, and the negative-going junction 194 forward biases the supply transistor 178 to keep providing the +5 V supply. So once clutch pedal depression initiates the 5 voltage supply, subsequent pedal action of clutch release has no effect on the regulated +5 V supply because independent operation of the latter is insured by its latching circuit 196.

A pedal switch monitoring circuit 202 is necessary in order for the program of the chip 150 to carry out the funtion of disengaging both power shift speed clutches whenever the master clutch 18 is disengaged by the pedal 186. The speed transmission, at both ends thereof, will therefore automatically be disconnected for easier synchronizations during shifts, and less delay by and wear on the synchronizers.

So, through a pi filter network 204, the alternately grounded and ungrounded conductor 138 is connected to a comparator 206, communicating its own output through a junction 208 directly to the chip 150. With respect to a +pin r, clutch depression closing the circuit 138, 140 to ground causes the voltage through pi network 204 to go low low, whereupon the +pin r will become less positive with respect to a −pin s on the comparator 206. So such pedal depression will cause the comparator output to go low, as it is communicated past junction 208 so as to be monitored by the chip 150. The power shift speed clutches are forthwith disengaged as this low signal is sensed.

Release of the pedal 186 disconnecting the conductor 138 from ground allows a pull up resistor 210 to raise the +pin r toward +5 volts so as to be positive with respect to the −pin s and bring up the output from the comparator. So, through the junction 208, a high signal is supplied to the chip 150 causing immediate reengagement thereby of the selected one of the power shifted speed clutches, not shown.

Through one or more of the several regulated +5 V inputs indicated for the chip 150, the chip powers a clock crystal oscillator 212 connected thereto which oscillates for example at 3.58 mhz and which thus operates the chip on frequency in a stable and precise manner.

In this way, chip timer TM0, among the several timers in ship 150, can accurately time a one second interval or a three second interval as necessary for purposes to be described. Similarly another timer TM1 will accurately time a 400 millisecond interval and another timer TM3 will accurately time a one minute interval.

SELECTED CLUTCH OPERATION—FIG. 5

In response to the input signal from the speed handle switch 58, the chip 150 is programmed to operate the selected one of the power shift speed clutches in the following manner.

The LO clutch solenoid 116 receives its B+ power through the service supply conductor 164 controlled by a set of normally open power relay LO contacts 214. This LO clutch relay is under control of a chip controlled relay coil 216 therefor.

One terminal of the relay coil 216 is connected to B+ voltage and the other terminal is connected to ground through an n-p-n transistor 218. The base of the transistor 218, through an interconnecting conductor 220, is normally connected to ground, internally by the chip 150. So the grounded emitter of the transistor 218 conducts no current. To activate the relay contacts 214, the chip 150 open circuits the conductor 220 whereupon a pull up resistor 222 causes the base electrode to go positive with respect to the emitter of transistor 218, thus being forward biased and conducting current through the relay coil 216 and closing the LO relay contacts 214 to pressurize and engage the low clutch.

In other words, the chip 150 pulls voltage in the conductor 220 low to declutch, whereas the positive chip signal allowing the conductor 220 to go positive causes the low clutch to engage.

A chip conductor 224 having connections to a relay coil 226 controlling the HI relay contacts 228 sends out a positive signal operating in the opposite way, namely, to deenergize the coil 226, open the contacts 228 and declutch. Those connections, closest to the coil 226, are made to a similar n-p-n transistor 230 which conducts and engages the clutch from a positive signal transmitted thereto through an intermediate, resistor containing conductor 232. But it is a negative signal in interconnecting conductor 224, i.e., when the voltage is pulled low therein, which causes the positive signal at 232 to engage the clutch. The reason is an intervening n-p-n transistor 234 which is biased by a resistor 236 so that grounding of the conductor 224 causes the base electrode of the transistor 234 to be less positive and cause the transistor 234 to cut off. The resulting positive base bias turns on the transistor 230 and therefore the HI contacts 228 close and engage the clutch. On the other hand when the normally ungrounded conductor 224 is left ungrounded by the chip 150, the HI contacts 228 open so as to deenergize the HI solenoid 114 and declutch. So the original intent is fulfilled, whereby the chip sends out a positive signal through conductor 224 to disengage the high clutch.

ELECTRICAL CLUTCH—MONITORING—FIG. 5

The 400 millisecond timer TM1 cooperates with a Hall effect cell or switch 238 in the solenoid supply conductor 164 and with a similar Hall effect switch 240 in the solenoid supply conductor 162 for proper timed monitoring of the solenoid currents and sensing thereof by the chip 150. Each time the Hall effect switch 238 or 240 of the selected clutch opens due to a current sensed below the threshold value, its chip pin conductor 242 or 244 goes low in potential and automatically the timer TM1 starts a 400 millisecond cycle. If the condition persists longer than 400 milliseconds, the chip 150 automatically goes into failure mode. Then through the appropriate conductor 220 or 224 from chip 150, the chip is programmed to disconnect the relay coil 216 or 226 of the selected solenoid and to disengage the corresponding clutch, not shown.

So short transients dropping the current in conductors 162 and 164 are overlooked, whereas a lasting fluctuation of 400 milliseconds keeping the current below threshold value such as 1.25 amperes is a danger signal which could lead to instability in positive clutch engagement and burning up a clutch, and so the clutch is automatically disengaged beforehand.

GENERAL FAILURE MODE OF MODULE—FIG. 5

Failure of the module 122 will in most conceivable circumstances result in a positive signal from all output pins of the chip 150. As already noted, a positive signal in conductor 224 will result in disengagement of the high clutch because of deenergization of the HI clutch solenoid 114, irrespective of which clutch is the selected one.

And, irrespective of which clutch is the selected one, a positive signal in the conductor 220 will result in energization of the LO clutch solenoid 116 so as to furnish a power shift, low drive available to retrieve the tractor under its own power from the point of module failure.

HYDRAULIC CLUTCH-MONITORING—FIG. 5

The chip timer TM0 cooperates with the pressure switches 118 and 120 to monitor the selected one of the power shift speed clutches, not shown. The timer TM0 ordinarily begins a one second cycle when the solenoid valve to a selected clutch opens. If the clutch pressure has not raised to upper threshold value (58 psi) by the end of the one second cycle, a failure mode is indicated and the ship 150 through conductors 220 or 224 deenergizes the solenoid of that clutch, thus declutching.

The same TM0 also starts later a one second cycle instantaneously with energization of the solenoid of an oncoming clutch, occurring while the offgoing clutch solenoid is still energized. If the pressure in the offgoing clutch does not fall below the 43 psi threshold value by the end of the one second cycle, a failure mode is indicated and the oncoming clutch solenoid is automatically deenergized by the chip 150 with an appropriate signal through conductors 220 or 224.

THREE SECOND CYCLES—FIG. 5

The chip 150 has a monitoring conductor 246 connected to a comparator 248 which is made responsive to a negative coefficient thermistor bead 250. The sentry module has a case in which bead 250 is mounted to serve in an analogous way as an indication of what the oil viscosity is in the high and low clutch service lines 78 and 92.

During normal operation temperatures of the tractor, the comparatively high ambient temperature sensed by the bead 250 is accompanied by a low resistance offered thereby so that at a junction 252 of the grounded bead with an energized resistor 254, the voltage goes low. The comparator 248 is so connected as to (similarly to comparator 206 previously mentioned) provide high output in conductor 246 indicating that an operating temperature is maintained and that the timer TM0 should be cycled for one second. So the chip 150, appropriately programmed, responds to the high comparator output by setting TM0 for a 1 second time interval.

During cold start up conditions on the other hand, the bead 250 in the module case being monitored by the chip is cold, offering relatively high resistance and hence causing the junction 252 to go more positive. The low comparator output resulting in conductor 246 is sensed by the chip 150 which is programmed to respond by increasing all of the referred to cycle of timer TM0 to three seconds. Thus the sluggish oil in the oncoming clutch as its pressure build-up is sensed by the pressure switch is allowed three seconds to reach the upper threshold value whereas the offgoing clutch pressure in the same way is allowed three seconds to drop below the lower threshold value as the sluggish oil is being drained from the offgoing clutch.

AUTOMATIC SHUT DOWN—FIG. 5

The sentry module 122 is set in operation as indicated by downpressing the clutch pedal 186 so as to complete the circuit at 138 and 140. At any point at which the pressure of both service lines 78 and 92 is detected to be below the upper threshold value (58 psi), the monitoring chip 150 starts timer TM3 on a one minute cycle. If no clutch pressure in either clutch is detected by the pressure switches by the end of the one minute cycle, the chip 150 is programmed automatically to shut down unless and until the pedal 186 is again downpressed.

SENTRY LIGHT—FIG. 5

The sentry light 124 is supplied from the B+ source in a circuit including a reverse protection diode 256 and an n-p-n transistor 258. The diode 556 as with other diodes of the circuit protects the n-p-n transistor against negative voltage transients which could come from the B+ storage battery post.

The base of the transistor 258 is normally grounded by the chip 150 so that through a resistor 260 the base electrode holds the transistor at cutoff.

During any failure mode protected by the chip 150, however, the ground from the chip to the resistor 260 is open circuited, and then a base bias resistor in series with the resistor 260 causes the base electrode to go positive. With such forward bias the transistor 258 conducts so as to illuminate the sentry light 124. The sentry light is on the instrument panel of the tractor and alerts the driver to some failure in the electrical hydraulic control and clutch system.

The light 124 will remain illuminated until the failure mode is corrected whereupon the chip is programmed to re-ground the resistor 260 and base electrode of the transistor.

+5 V SHUT DOWN—FIG. 5

The +5 V regulator 180 and the +5 V latching circuit 196 are shut down when the one minute TM3 timer times out. For that purpose the chip 150 grounds an output conductor 262 so as to forward bias a p-n-p transistor 264 and cause it to conduct. Therefore the voltage goes low in the +5 V circuit 196 and biases the latching circuit transistor 200 to cutoff so as to stop the supply transistor 178 from conducting. Therefore the regulator 180 which is being supplied is deenergized and the +5 V supply at junction 182 is discontinued.

So there is no drain on the B+ source so long as a full failure exists or the tractor is idle. In the former condition, depression of the clutch pedal 186 will restart the sentry module circuit and in the later condition the depression of the clutch pedal 186 will likewise set the circuit of sentry module 122 back in operation after being idle.

In one physically constructed embodiment of the invention the chip 150 was a commercially obtained ID8048.

A consolidation and summary of the nine states described for the sentry module follows.

State 0 This is the state Sentry is in when the master clutch is disengaged. In this state both master clutch undertakes its delayed engagement.

State 1 This is entered when the master clutch is released with the high range selected. The HI range solenoid is turned on and the LO range solenoid remains off. The Sentry will remain in this state for 1 second (3 seconds if cold) allowing time for the pressure in the high range clutch to rise above the pressure switch upper setpoint.

State 2 This is the stable state for operation in the high range. In this state the HI range solenoid is on and the LO range solenoid is off. The sentry will remain in this state until a shift to the low range is requested, or a failure occurs, or the master clutch is disengaged.

State 3 This state is entered when the Sentry shifts on the go from the high range to the low range. In this state both solenoids are on and the Sentry is waiting for the pressure in the low range to rise to the upper setpoint. The Sentry will remain in this state a maximum of 1 second (3 seconds if cold).

State 4 This state is entered when the Sentry is in the process of shifting on the go from the high to the low range. In this state, the HI range solenoid is turned off and the LO range solenoid is left on. The sentry is waiting 1 second (3 seconds if cold) to allow time for the pressure in the high range to drop below the pressure switch lower setpoint.

State 5 This is the stable operating state for the low range. In this state the LO range solenoid is on and the HI range solenoid is off. The sentry will remain in this state until a shift to the high range is requested, or a failure occurs, or the master clutch is disengaged.

State 6 This state is entered when the Sentry is shifting on the go from the low range to the high range. In this state both solenoids are turned on and the range to rise above the pressure switch upper setpoint. The Sentry will remain in this state for a maximum of 1 second (3 seconds if cold).

State 7 This state is entered when the Sentry is in the process of shifting on the go from the low range to the high range. In this state the LO range solenoid is turned off and the high range solenoid remains on. The Sentry is waiting 1 second (3 seconds if cold) to allow time for the pressure in the low range to drop below the pressure switch lower setpoint.

State 8 This state is entered when the master clutch is released with the low range selected. In this state the LO range solenoid is turned on and the HI range solenoid remains off. The Sentry is waiting 1 second (3 seconds if cold) to allow time for the pressure in the low range to rise above the pressure switch upper setpoint.

State 9 This state is entered if a failure has been detected. One and sometimes both solenoids are turned off and the Sentry light is turned on. The Sentry will remain in this state for a maximum of 1 minute. If the master clutch has not been disengaged in 1 minute, the Sentry module will turn itself off to avoid battery drain. The Sentry module will turn on again when the master clutch is disengaged.

Failure modes including sentry module modes accompanied by illumination of the indicator light described are consolidated and summarized as follows:

| SINGULAR FAILURE | ORIGINAL RANGE | SHIFT REQUEST | SENTRY REACTION | INDICATOR LIGHT |
|---|---|---|---|---|
| LO range valve sticks in the closed position (clutch disengaged) | LO | NONE | Disengage both solenoids | YES |
| or | LO | LO-HI | Engage HI range solenoid | NO |
| LO range pressure switch sticks in non-pressurized position | HI | NONE | Remain in HI | NO |
|  | HI | HI-LO | Remain in HI | YES |
| LO range valve sticks in the open position (clutch engaged) | LO | NONE | Remain in LO | NO |
|  | LO | LO-HI | Remain in LO | YES |
| or LO range pressure switch sticks in pressurized position | HI | NONE | Disengage both solenoids | YES |
|  | HI | HI-LO | Engage LO range |  NO |

-continued

| SINGULAR FAILURE | ORIGINAL RANGE | SHIFT REQUEST | SENTRY REACTION | INDICATOR LIGHT |
|---|---|---|---|---|
| HI range valve sticks in the closed position (clutch disengaged) or HI range pressure switch sticks in non-pressurized position | LO | NONE | solenoids Remain in LO | NO |
| | LO | LO-HI | Remain in LO | YES |
| | HI | NONE | Disengage both solenoids | YES |
| | HI | HI-LO | Engage LO range solenoid | NO |
| HI range valve sticks in the open position (clutch engaged) or HI range pressure switch sticks in the pressurized position | LO | NONE | Disengage both solenoids (tractor may keep moving) | YES |
| | LO | LO-HI | Engage HI range solenoid | NO |
| | HI | NONE | Remain in HI | NO |
| | HI | HI-LO | Remain in HI | YES |
| LO range coil opens | LO | NONE | Disengage both solenoids after 400 m sec | YES |
| | LO | LO-HI | Engage HI range solenoid | YES |
| | HI | NONE | Remain in HI | NO |
| | H-I | HI-LO | Remain in HI | YES |
| HI range coil opens | LO | NONE | Remain in LO | NO |
| | LO | LO-HI | Remain in LO | YES |
| | HI | NONE | Disengage both solenoids after 400 m sec | YES |
| | HI | HI-LO | Engage LO range solenoid | YES |
| Range selector sticks in HI | HI (By Default) | N/A | Remain in HI | NO |
| Range selector sticks in LO | LO (By Default) | N/A | Remain in LO | NO |
| Range selector switch defective (neither range selected or both ranges selected) | LO | NONE | Remain in LO | NO |
| | HI | NONE | Remain in HI | NO |
| | Start UP (Reset Due to Neutral Start Sw.) | NONE | Default IN HI | NO |
| Neutral start switch sticks open during operation | LO | NONE | Operate normally | NO |
| | LO | LO-HI | | |
| | HI | NONE | Operate normally | NO |
| | HI | HI-LO | | |
| Neutral start switch sticks closed | LO | NONE | Disengage both solenoids | NO |
| | LO | LO-HI | | |
| | HI | NONE | Disengage both | NO |
| | HI | HI-LO | | |

Significant factors have played a role in the important design considerations hereinabove. I. What the large hydraulic volume and large clutch travel of the mid-mounted manual clutch mean, of significance to the designer of the clutches, is that the manual clutch must have a head start in initiation of its engagement over the HI and LO ratio power shift clutches. So the longer clutch fill time and longer full engagement pressure rise time are, by known programming technique, automatically compensated for by the downpressed clutch pedal and pedal switch. The pedal and switch do not allow the sentry module to initiate power shift clutch engagement until after initiation of the manual clutch engagement which, for full engagement, is time-delayed by its own relative slowness in ultimately building up to full engagement pressure.

II. The large clutch face surface area and high energy absorbing capacity evidenced merely by inspection of the manual clutch pack disks (18, FIG. 2) mean, to the designer, that the software, by known technique, must be programmed to fully engage forthwith the quick response, power shift clutch selected, all to be accomplished within delay time of engagement of the manual clutch. So the selected, small power shift clutch is always fully engaged and stabilized before the large capacity manual clutch takes over the full burden of coupling together the engine-connected speed and load-connected range transmissions for their synchronized power transmitting operation in tandem.

III. Monitoring each supposedly active pressure switch for any undesired zero hydraulic pressure interval is evident in its meaning and purpose to the designer, because such a full failure mode (valve temporarily sticking, for one example) for only an interval with a small shift clutch could put it out of sequence when it did finally engage, and tax it beyond what the designer had designed it for. So in this evident situation the software program perforce shuts down the clutch automatically to insure against damage from any reengagement.

IV. Monitoring each supposedly active pressure switch at end setpoints (58 and 43 psi) of a critical threshold pressure established by the designer for the selected power shift clutch is not so evident in its meaning and purpose, however. Such clutch can just as seriously be damaged if the clutch cylinder pressure hunts around (erratic pump, oscillating valve) in and from the threshold range with a hesitant or tentative action causing off and on slip over an interval of time. So timed threshold pressure monitoring is equally important as a programmed consideration in automatically shutting down a selected power shift clutch.

V. Monitoring each supposedly active Hall effect switch for any undesired zero current interval is evident in its meaning and purpose to the clutch solenoid switch designer. Such a full power lapse failure (intermittently open winding, for one example) for only an interval with a small power shift clutch could put it out of sequence, and eventually tax it beyond its design capability. So the need for automatic programming of a shutdown for such a clutch is evident.

VI. Monitoring each supposedly active Hall effect switch at a critical current threshold (1.25 amperes) established by the designer for the selected power shift clutch is not so evident in its meaning and purpose, however. Again, the solenoid supply current if it hunts around the threshold value can cause an undesirable hesitant or tentative clutch action, and an off and on slipping clutch over a time interval. So timed threshold current monitoring for the clutch solenoids and automatic clutch shut down are equally important to be programmed in here.

VII. What the described emergency programming means, in regard to the failure examples foregoing such as an oncoming selected clutch which malfunctions as monitored and which is forthwith automatically shut down, and in regard to the offgoing clutch which is still effective as monitored and which is automatically kept engaged although no longer selected by the operator, is that the tractor keeps pulling to bring it in from the fields even though the sentry light continually shows failure mode due to the unused, malfunctioning clutch. In other words, continuing to operate one good clutch in no way further jeopardizes the malfunctioning clutch.

Variations within the spirit and scope of the invention described are equally comprehended by the foregoing description.

What is claimed is:

1. In a transmission with multiple power paths of different effective gear ratios including a plurality of gears and first and second electrically operated clutches cooperating therewith, said transmission further including first and second clutch controlling timer means provided with first and second power relay contacts for electrically controlling the respective first and second electrically operated clutches for shifting the transmission from a first gear ratio to a second gear ratio through application of electricity by the first power relay contacts to the first electrically operated clutch to simultaneously engage the first clutch while the second electrically operated clutch is engaged and then by interruption of electricity applied by the second power relay contacts to the second electrically operated clutch to disengage the second clutch, said contacts applying and interrupting electricity to the respective electrically operated clutches as aforesaid consisting of power relay contacts individual to different ones of the clutches for separate operation so as to free each clutch from necessarily interrupting when the contacts of the other clutch independently interrupt the electricity to the latter:

the improvement comprising first means (118 open,120 open,TM0,218) including timing means (TM0) in the first clutch controlling timer means responsive to a status mode of failure of the second clutch (HI) for automatically causing the first power relay contacts (214) to interrupt the electricity applied to the first one (LO) of said clutches when the latter have been simultaneously engaged for more than a predetermined time interval, thereby automatically disengaging that particular clutch; and second means (120 recloses,234,230) in the clutch controlling timer means responsive to disengagement of the first electrically operated clutch (LO) for automatically causing the second power relay contacts (228) to continue the electricity applied to the second electrically operated clutch (HI) to insure continued engagement of the latter.

2. In a transmission with multiple power paths of different effective gear ratios including a plurality of gears and first and second electrically operated clutches cooperating therewith, said transmission further including first and second clutch controlling timer means provided with first and second power relay contacts for electrically controlling the respective first and second electrically operated clutches for shifting the transmission from a first gear ratio to a second gear ratio through application of electricity by the first power relay contacts to the first electrically operated clutch to simultaneously engage the first clutch while the second electrically operated clutch is engaged and then by interruption of electricity applied by only one of said power relay contacts to that particular one of the electrically operated clutches concerned to automatically disengage same, the improvement therein characterized by:

the first clutch being that particular one of the engaged clutches which is then automatically disengaged by the first power relay contacts, said first and second contacts applying and interrupting electricity to the respective electrically operated clutches as aforesaid consisting of power relay contacts individual to different ones of the clutches for separate operation so as to free each clutch from necessarily interrupting when the contacts of the other clutch independently interrupt the electricity to the latter;

first means (118 open,120 open,TM0,218) including timing means (TM0) in the first clutch controlling timer means responsive to a status mode of failure of the second clutch controlling timer means for the second clutch (HI) for automatically causing the first power relay contacts (214) to interrupt the electricity applied to the first one (LO) of said clutches and thereby disengage that one of the clutches when the latter have been simultaneously engaged for more than a predetermined time interval; and second means (120 recloses,234,230) in the first clutch controlling timer means responsive to disengagement of the first electrically operated clutch (LO) for automatically causing the second power relay contacts (228) to continue the electricity applied to the second electrically operated clutch (HI) to insure continued engagement of the latter.

3. In a transmission with multiple power paths of different effective gear ratios including a plurality of gears and first and second clutches cooperating with said gears for shifting the transmission from a first gear ratio to a second gear ratio by engaging the first clutch while substantially disengaging the second clutch, said transmission further including a power input shaft; a power delivery shaft; a power output shaft; a first interposed power path with certain of said gears arranged to form therein a first power transferring means for transferring power between said power input shaft and said power delivery shaft at a first speed ratio; a second interposed power path with others of said gears arranged to form therein a second power transferring means for transferring power between said power input shaft and said power delivery shaft at a second speed ratio; said first clutch cooperating with said first power transferring means for selectively interrupting the flow of power through said first power path between said power input shaft and said power delivery shaft; said second clutch cooperating with said second power transferring means for selectively interrupting the flow of power through said second power path between said power input shaft and said power delivery shaft; said power delivery shaft and said power output shaft being gearing-connected and having an interposed manual clutch which couples same except when it disengages; first electrical hydraulic means for selectively engaging and disengaging said first clutch; and second electrical hydraulic means for selectively engaging and disengaging said second clutch;

the improvement comprising selector means for causing said first and second electrical hydraulic means to selectively engage the first clutch while substantially simultaneously disengaging the second clutch in the described way, said selector means including:

first means responsive to the first clutch for preventing the second electrical hydraulic means from its disengagement of said second clutch until said first clutch is substantially engaged;

second means including timer means responsive to a status mode of failure of the first and second clutches in exerting simultaneous engagement for more than a predetermined time interval, selectively effective for causing the first electrical hydraulic means to disengage the first clutch, so as to prevent said first and second clutches from thereafter being simultaneously engaged during such failure mode; and third means effective in the failure mode in response to the resulting disengagement of the first clutch for preventing the second electrical hydraulic means from disengaging the second clutch.

4. In a transmission with multiple power transmission path portions of different effective gear ratios including a plurality of gears and first and second electrically operated clutches cooperating therewith, said transmission further including first and second clutch controlling timer means provided with electrical connections for electrically controlling the respective first and second electrically operated clutches for selecting a clutch initially for its ratio and further for shifting the transmission from a first gear ratio to a second gear ratio through application of electricity by the electrical connections to the first electrically operated clutch to simultaneously engage the first clutch while the second electrically operated clutch is engaged and then by interruption of electricity applied by the electrical connections to the second electrically operated clutch to disengage the second clutch, the transmission path portions merging in said transmission into a common power path, a master clutch connected in said common power path effectively in series with the first and second clutches as selected, and an hydraulic master clutch control actuated for operating with a delay for hydraulically controlling the delayed engagement and the disengagement of the master clutch, the improvement comprising:

means responsive to the master clutch effective to disengage said first and second clutches when said hydraulic master clutch control is operating to disengage the master clutch;

means responsive to the initiation of operation of said hydraulic clutch control to engage the master clutch with delay, effective to operate the clutch controlling timer means for instantaneously applying electricity through the electrical connections to the selected electrically operated clutch for forthwith engaging the selected clutch;

said electrical connections applying and interrupting electricity to the first and second electrically operated clutches as aforesaid consisting respectively of first and second power relay contacts individual to different ones of the clutches for separate operation so as to free each clutch from necessarily interrupting when the contacts of the other clutch independently interrupt the electricity to the latter;

means including timing means in the first clutch controlling timer means responsive to a status mode of failure of the second clutch for automatically causing the first power relay contacts to interrupt the electricity applied to the first one of said clutches when the latter have been simultaneously engaged for more than a predetermined time interval, thereby automatically disengaging only that particular clutch during such failure mode; and manual actuating means connected to the hydraulic master clutch control insuring operator control to keep the master clutch actuated in engaged position.

5. In a transmission with multiple power path portions of different effective gear ratios including a plurality of gears and first and second electrically operated clutches cooperating therewith, said transmission further including first and second clutch controlling timer means provided with first and second power relay contacts for electrically controlling the respective first and second electrically operated clutches for shifting the transmission from a first gear ratio to a second gear ratio through application of electricity by the first power relay contacts to the first electrically operated clutch to simultaneously engage the first clutch while the second electrically operated clutch is engaged and then by interruption of electricity applied by the second power relay contacts to the second electrically operated clutch to disengage the second clutch, said contacts applying and interrupting electricity to the respective electrically operated clutches as aforesaid consisting of power relay contacts individual to different ones of the clutches for separate operation so as to free each clutch from necessarily interrupting when the contacts of the other clutch independently interrupt the electricity to the latter, the transmission path portions merging in said transmission into a common power path, and a master clutch connected in said common power path effectively in series with such of the first and second clutches as selected, the improvement comprising:
- means (118 open,120 open,TM0,218) including timing means (TM0) in the first clutch controlling timer means responsive to a status mode of failure of the second clutch controlling timer means for the second clutch (HI) for automatically causing the first power relay contacts (214) to interrupt the electricity applied to the first one (LO) of said clutches when the latter have been simultaneously engaged for more than a predetermined time interval, thereby automatically disengaging only that particular clutch during such failure mode;
- an hydraulic master cluch control (66a,66b,72) actuated for operating with a delay for hydraulically controlling the delayed engagement and the disengagement of the master clutch;
- means (138,194,200,150) responsive to the initiation of operation of said hydraulic master clutch control to engage the master clutch with delay, effective to operate the clutch controlling timer means for instantaneously applying electricity through the power relay contacts for electrically operated clutch engagement forthwith; and
- manual actuating means (186) connected to the hydraulic master clutch control insuring operator control to keep the master clutch actuated in engaged operation.

6. In change speed transmission means including a speed transmission with multiple power path portions of different gear ratios including a plurality of synchronized manual, and also power, change speed gears and engine-connected first and second clutches cooperating therewith for, in addition to the synchronized manual change speed shifting, affording a power shift in the change speed gears with both and then with either cluch as selected, said speed transmission further including clutch controlling means for electrically controlling the respective first and second clutches at an engine-connected end of the transmission for selecting said first clutch initially for its ratio and further for power shifting the transmission from a first gear ratio to a second gear ratio by application of electricity to the clutch controlling means to simultaneously engage the first clutch while the second clutch is engaged and then by interruption of electricity applied to the clutch controlling means to disengage the second clutch, said speed transmission arranged with an output end and with the speed transmission portions merging in said transmission into a common power path at the output end thereof, a manual master clutch connected in said common power path effectively in series with the intervening change speed gears and with the first and second clutches as selected for the power shift, and a clutch pedal depressable to disengage and releasable to reengage the manual master clutch, the combination, with the synchronized manual change speed gears in said speed transmission, of:
- shift means normally operable separately but simultaneously upon depression of the clutch pedal and having a manual device connected to the synchronized manual change speed gears to thereupon manually change a gear ratio;
- synchornizer means operable during a gear ratio change to mechanically resynchronize the manual change speed gears to the changed ratio to expedite and quiet the manual shifting of the gears; and for further expediting and quieting,
- automatic means responsive to the manual disengagement of the master clutch for interrupting the electricity applied to the clutch controlling means which thereupon, simultaneously with unloading of the output end of the speed transmission by the master clutch, causes the first and second clutches to be in simultaneous disengagement automatically with each such disengagement of the master clutch so as to unload the engine connected end of the speed transmission.

7. The combination of change speed transmission means in accordance with claim 6, further comprising:
- hydraulic clutch control means operated by the clutch pedal and operating with a delay for hydraulically controlling the delayed engagement of the master clutch; and
- monitor means responsive to the initiation of operation of said hydraulic clutch control means to engage the master clutch with delay, for instantaneously applying electricity to said clutch controlling means for said first clutch for forthwith engaging the latter.

8. The combination in change speed transmission means in accordance with claim 7, characterized by:
- said shift means also having a switch device for selecting the first clutch; and
- a microcomputer included in said monitor means monitoring the switch device for instantaneously applying electricity to the aforesaid clutch controlling means for reselecting and reengaging the first clutch preceding substantial engagement of the master clutch.

9. A change speed transmission power train comprising:
- a power input shaft;
- a power delivery shaft;
- a power output shaft;
- a first interposed power path arranged with first power transferring means therein for transferring power between said power input shaft and said power delivery shaft at a first speed ratio;

a second interposed power path arranged with second power transferring means therein for transferring power between said power input shaft and said power delivery shaft at a second speed ratio;

a first clutch cooperating with said first power transferring means for selectively interrupting the flow of power through said first power path between said power input shaft and said power delivery shaft;

a second clutch cooperating with said second power transferring means for selectively interrupting the flow of power through said second power path between said power input shaft and said power delivery shaft;

said power delivery shaft and said power output shaft being gearing-connected and having an interposed manual clutch which couples same except when it disengages;

first electrical hydraulic means for selectively engaging and disengaging said first clutch;

second electrical hydraulic means for selectively engaging and disengaging said second clutch;

selector means for causing said first and second electrical hydraulic means to selectively engage the first clutch while substantially simultaneously disengaging the second clutch;

said selector means including first means responsive to the engagment of the first clutch for preventing the second electrical hydraulic means from disengaging the second clutch until the first clutch has engaged;

second means including timer means responsive to a status mode of failure of the first and second clutches in exerting simultaneous engagement for more than a predetermined time interval selectively effective for causing the first electrical hydraluic means to disengage the first clutch;

third means effective in the failure mode in response to the resulting disengagement of the first clutch for preventing the second electrical hydraulic means from disengaging the second clutch; and fourth means responsive to the disengagement of the manual clutch effective to cause the first and second electrical hydraulic means to disengage respectively said first and second clutches.

10. The invention according to claim 9, said manual clutch characterized by a comparative delay in effectively coupling the power delivery shaft and the power output shaft once engagement of the manual clutch has been initiated; and means responsive to initiation of engagement of the manual clutch to forthwith reengage the first clutch.

11. In a transmission with multiple power path portions of different effective gear ratios including a plurality of gears and first and second pressure actuated clutches cooperating therewith for engaging and disengaging the transmission by engaging and disengaging a first selective clutch for its ratio and further for shifting the transmission from a first gear ratio to a second gear ratio by engaging the selected first clutch and disengaging the second clutch, and a power supplying storage battery, the improvement comprising:

electrical hydraulic clutch controlling means having control over the clutches for engaging generally one clutch and sometimes both clutches temporarily, having a regulated power source itself interruptedly supplied from the storage battery, and having means pressure responsive to disengagement of both clutches for more than a predetermined time interval automatically to interrupt the battery supply to said clutch controlling means regulated power source to save drain on the storage battery.

12. In a transmission in accordance with claim 11 and in which the transmission path portions merge in said transmission into a common power path, said transmission further including a master clutch connected in said common power path effectively in series with the first and second clutches as selected, the further improvement comprising:

electrical control means responsive to disengagement of the master clutch to thereupon reconnect the battery supply and said regulated power source to afford from the latter regulated power to the electrical hydraulic clutch controlling means.

13. Mode of automatically operating a transmission with first and second power shift clutches at the transmission power input end and with intervening gear ratio trains therefollowing, said first and second power shift clutches cooperating with the gear ratio trains for engaging and disengaging the transmission by a shift from a first gear ratio to a second gear ratio by first engaging the first clutch to afford a period of overlap in operation of the power shift clutches and second by later disengaging the second clutch, said transmission having a power output end, and a manual master clutch in a common power path in said power output end effectively in series with the intervening gear ratio trains and with the power shift clutches selectively in engagement, said mode, effective to prevent an excessive interval of time of the power shift clutches overlapping in their operation, comprising the steps of:

disengaging the first power shift clutch, automatically in reacting to a status mode of failure conditions of any indication sensed of the second power shift clutch having failed to disengage after a predetermined interval of timed overlap;

disengaging the second power shift clutch, automatically in reverting to the status mode of a normal condition of the first power shift clutch becoming substantially engaged within a predetermined interval of timed first engagement; and disengaging no less than one power shift clutch, automatically upon disengagement of the master clutch.

14. A coordinating method to change speed in transmission means including a speed transmission with multiple power path portions of different gear ratios including a plurality of synchronized manual, and also power, change speed gears and engine-connected first and second clutches cooperating therewith for, in addition to the synchronized manual change speed shifting as afforded, affording a power shift in the change speed gears with both and then with either clutch as selected, said speed transmission further including clutch controlling means for electrically controlling the respective first and second clutches at an engine-connected end of the speed transmission for selecting said first clutch initially for its ratio and further for power shifting the speed transmission from a first gear ratio to a second gear ratio by application of electricity to the clutch controlling means to simultaneously engage the first clutch while the second clutch is engaged and then by interruption of electricity applied to the clutch controlling means to disengage the second clutch, said speed transmission arranged with an output end and with the speed transmission portions merging in said transmission into a common power path at the output end thereof, a manual master clutch connected in said common power path effectively in series with the intervening change speed gears and with the first and second clutches as selected for the power shift, and a clutch pedal depressible to disengage and releasable to reengage the manual master clutch, said method comprising:

manually and simultaneously upon depression of the clutch pedal changing a gear ratio in the synchronized manual change speed gears of said speed transmission;

mechanically re-synchronizing the manual change speed gears to the changed ratio to expedite and quiet the manual shifting of the gears; and for further expediting and quieting, automatically and in response to the disengagement of the manual master clutch interrupting the electricity applied to the clutch controlling means which thereupon, simultaneously with unloading of the output end of the speed transmission by the manual master clutch, causes the first and second clutches to be in simultaneous disengagement automatically with each such disengagement of the manual master clutch so as to unload the engine-connected end of the speed transmission.

15. The improvement in the change speed method according to claim 14, further comprising:

hydraulically, and in response to the clutch pedal, controlling a delayed engagement of the manual master clutch; and automatically and instantaneously in response to the initiation of controlling the hydraulic engaging of the master clutch with delay, applying electricity to the clutch controlling means of said first clutch for forthwith engaging the latter.

16. The improved change speed method in accordance wth claim 15, characterized by;

selectively switching the electricity applied to cause said first clutch to be the one selected; and monitoring and controlling by microcomputing for monitoring the switching so as instantaneously to apply electricity to said clutch controlling means of the first clutch for reselecting and reengaging the latter preceding substantial engagement of the manual master clutch.

* * * * *